United States Patent
Preston et al.

(10) Patent No.: US 12,110,860 B2
(45) Date of Patent: Oct. 8, 2024

(54) WIND TURBINE BLADE MANUFACTURE

(71) Applicant: Vestas Wind Systems A/S, Aarhus N. (DK)

(72) Inventors: Robert Charles Preston, Cowes (GB); Sean Keohan, Shanklin (GB)

(73) Assignee: Vestas Wind Systems A/S, Aarhus (DK)

(*) Notice: Subject to any disclaimer, the term of this patent is extended or adjusted under 35 U.S.C. 154(b) by 423 days.

(21) Appl. No.: 17/415,052

(22) PCT Filed: Dec. 18, 2019

(86) PCT No.: PCT/DK2019/050408
§ 371 (c)(1),
(2) Date: Jun. 17, 2021

(87) PCT Pub. No.: WO2020/125903
PCT Pub. Date: Jun. 25, 2020

(65) Prior Publication Data
US 2022/0063207 A1    Mar. 3, 2022

(30) Foreign Application Priority Data
Dec. 20, 2018 (DK) .............. PA 2018 70835

(51) Int. Cl.
*F03D 1/06* (2006.01)
*B29C 65/00* (2006.01)
(Continued)

(52) U.S. Cl.
CPC ........ *F03D 1/0675* (2013.01); *B29C 65/8292* (2013.01); *B29C 65/48* (2013.01);
(Continued)

(58) Field of Classification Search
CPC .. B29C 65/48–485; B32B 37/12–1207; B32B 2037/1215–1269; B32B 2603/00;
(Continued)

(56) References Cited

U.S. PATENT DOCUMENTS 4,295,790 A   10/1981 Eggert, Jr.
8,454,791 B2   6/2013 Gau
(Continued)

FOREIGN PATENT DOCUMENTS

CN   101660486 A   3/2010
CN   104812554 A   7/2015
(Continued)

OTHER PUBLICATIONS

Danish Patent and Trademark Office, Search and Examiantion Report in PA 2018 70835, May 29, 2019.
(Continued)

*Primary Examiner* — Carson Gross
(74) *Attorney, Agent, or Firm* — Wood Herron & Evans LLP

(57) ABSTRACT

A method of forming a structural web for a wind turbine blade comprises providing a web member having a web portion and a flange portion extending away from each other, where 5 a heel of substantially curvilinear form is located between the web portion and the flange portion. A planar flange extender comprising a cured composite material is arranged together with the web member with the flange extender positioned adjacent to the flange portion so that a portion of the flange extender projects past the heel and away from the web portion. The flange extender is integrated with the web member in a resin matrix, or 10 with an adhesive, to form the structural web. A structural web and a wind turbine blade comprising the web is disclosed.

17 Claims, 6 Drawing Sheets

(51) Int. Cl.
  *B29C 65/48* (2006.01)
  *B29C 65/82* (2006.01)
  *B29L 31/08* (2006.01)
  *B32B 37/12* (2006.01)

(52) U.S. Cl.
  CPC ... *B29C 66/73751* (2013.01); *B29L 2031/085* (2013.01); *B32B 37/12* (2013.01); *B32B 2603/00* (2013.01); *F05B 2230/50* (2013.01); *F05B 2240/302* (2013.01); *F05B 2280/6015* (2013.01)

(58) Field of Classification Search
  CPC . F03D 1/0684; F03D 1/0675; B29L 2031/085
  See application file for complete search history.

(56) References Cited

U.S. PATENT DOCUMENTS

| | | | |
|---|---|---|---|
| 8,967,976 | B2 | 3/2015 | Pascual et al. |
| 9,393,744 | B2* | 7/2016 | Anderson ............. B29C 70/526 |
| 2013/0055677 | A1 | 3/2013 | Hayden et al. |
| 2015/0136305 | A1* | 5/2015 | Ullmann .................. B25J 9/026 156/64 |
| 2017/0067439 | A1 | 3/2017 | Yarbrough et al. |
| 2017/0211543 | A1 | 7/2017 | Sandercock et al. |
| 2017/0241401 | A1 | 8/2017 | Smith et al. |
| 2017/0320275 | A1* | 11/2017 | De Waal Malefijt ........................ B29D 99/0003 |
| 2018/0283349 | A1 | 10/2018 | Wardropper et al. |

FOREIGN PATENT DOCUMENTS

| | | |
|---|---|---|
| CN | 105899353 A | 8/2016 |
| CN | 105934328 A | 9/2016 |
| CN | 107107487 A | 8/2017 |
| CN | 107650393 A | 2/2018 |
| CN | 107923365 A | 4/2018 |
| CN | 108152376 A | 6/2018 |
| CN | 108614034 A | 10/2018 |
| EP | 2492497 A2 | 8/2012 |
| EP | 3212375 A1 | 9/2017 |
| WO | 2013143641 A1 | 10/2013 |
| WO | 2015078561 A1 | 6/2015 |
| WO | 2016015735 A1 | 2/2016 |
| WO | 2016066207 A1 | 5/2016 |
| WO | 2016101953 A1 | 6/2016 |

OTHER PUBLICATIONS

European Patent Office, International Search Report and Written Opinion in PCT Application No. PCT?DK2019/050408, Mar. 6, 2020.

European Patent Office, Examination Report issued in corresponding European Patent Application No. 19827615.6, dated Dec. 5, 2022.

China National Intellectual Property Administration, office action issued in corresponding Chinese application No. 201980091908.9, dated Apr. 26, 2023, with English translation.

Andre Lamarre, Improved Inspection of Composite Wind Turbine Blades with Accessible Advanced Ultrasonic Phased Array Technology, Nov. 17, 2017 (Nov. 17, 2017), XP055671492, Retrieved from the Internet: URL:https://www.ndt.net/events/APCNDT2017/app/content/Paper/227_Lamarre_Rev3.pdf [retrieved on Feb. 25, 2020].

* cited by examiner

WIND TURBINE BLADE MANUFACTURE

TECHNICAL FIELD

The present disclosure relates to a structural web of a wind turbine blade and to a method of forming a structural web. The disclosure also relates to a method of assessing the integrity of adhesive bonds between the structural web and wind turbine blade shell using non-destructive ultrasonic testing techniques.

BACKGROUND

Typically wind turbine blades are manufactured in two halves, or shells, which are adhesively bonded together along a leading edge and a trailing edge. One or more structural webs are commonly provided between the shell halves.

Adhesive is used to bond the inner surfaces of the shells to the shear web structure, and to bond the outer edges of the shells together. It will be appreciated that the adhesive bonds provide critical connections between the various components of the blade, and that the bonds must therefore have extremely high integrity to withstand the high forces and fatigue loads experienced in operation. To this end, the process of forming and assessing adhesive bonds during production of wind turbine blades must be highly robust.

It will be appreciated that any flaw in an adhesive bond between the component parts of a wind turbine blade is a potential source of crack propagation and/or failure in use. It is therefore desirable that any flaws in the adhesive bonds are detectable using non-destructive analysis techniques so that they may be remedied before the wind turbine blade is put into service.

It is against this background that the present invention has been developed.

SUMMARY OF THE INVENTION

An aspect of the invention provides a method of forming a structural web for a wind turbine blade. The method comprises providing a web member having a web portion and a flange portion extending away from the web portion, wherein the web member comprises a heel of substantially curvilinear form located between the web portion and the flange portion; and providing a flange extender of substantially planar form, wherein the flange extender comprises a cured composite material. The flange extender is arranged together with the web member such that the flange extender is positioned adjacent to the flange portion and such that a portion of the flange extender projects past the heel and away from the web portion. The flange extender is integrated together with the web member in a resin matrix, or with an adhesive, to form the structural web.

Optionally the method comprises applying adhesive between the web member and the flange extender. The application of the adhesive may preferably be in the region of the heel.

Preferably applying the adhesive comprises applying the adhesive to the web member and the flange extender at substantially the same time.

In a preferred example, a filler material is placed between the web member and the flange extender. The filler material may comprise a rope positioned substantially adjacent to the heel.

Applying the adhesive may optionally comprise applying a bead of adhesive to the flange portion; bringing the flange extender into contact with the adhesive; and applying a compressive force between the flange portion and the flange extender.

Optionally the web member may comprise an uncured composite material prior to integration of the flange extender with the web member.

Preferably a fillet is formed in the adhesive.

The flange extender may have a thickness of between 0.5 mm and 1 mm, preferably around 0.8 mm. The flange portion of the web may have a thickness of between 1 mm and 5 mm, preferably between 2 mm and 3 mm. The flange portion of the web may be at least twice as thick as the flange extender. The "thickness" refers to the size of the components between its two major surfaces.

The web member may comprise two flange portions and may have a substantially C-shaped cross-section.

A flange extender is preferably integrated with each flange portion.

In another aspect the present invention provides a method of forming a wind turbine blade comprising forming a structural web using the method above, positioning the structural web between windward and leeward wind turbine blade shells, and bonding the structural web to the windward and leeward wind turbine blade shells.

In a further aspect the present invention provides a structural web for a wind turbine blade comprising a web member having a web portion and a flange portion extending away from the web portion, wherein the web member comprises a heel of substantially curvilinear form located between the web portion and the flange portion; and a flange extender integrated with the flange portion of the web member, wherein a first section of the flange extender overlies the flange portion and a second section of the flange extender extends past the heel and away from the web portion of the web member.

Preferably a bead of adhesive is located between the heel of the web member and the flange extender.

A rope filler material may be embedded within, or located under, the bead of adhesive.

In a still further aspect, the present invention provides a wind turbine blade comprising the structural web.

BRIEF DESCRIPTION OF THE DRAWINGS

The present invention will now be described by way of non-limiting examples with reference to the following figures, in which:

FIG. 3b shows a schematic representation of a manufacturing process for forming the structural web of FIG. 3a;

FIG. 6a shows a schematic cross-sectional view of a section of the bonded structural web of FIG. 5a.

DETAILED DESCRIPTION

Figure 1:
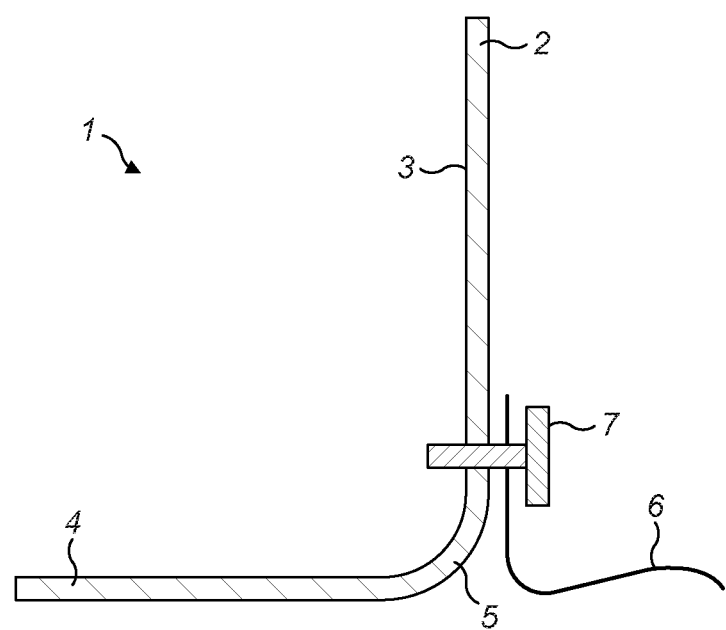
FIG. 1 shows a schematic view of a cross-section of a prior art structural web.

FIG. 1 shows a schematic view of a cross-section of a prior art structural web assembly 1 comprising a web member 2 having a web portion 3 and a flange portion 4. A substantially curvilinear heel 5 is located between the web portion 3 and the flange portion 4. The web member 2 is made of a composite material such as a glass fibre composite. A plastic glue catcher 6 is attached to the web portion 3 by plastic scrivets 7.

Figure 2A:
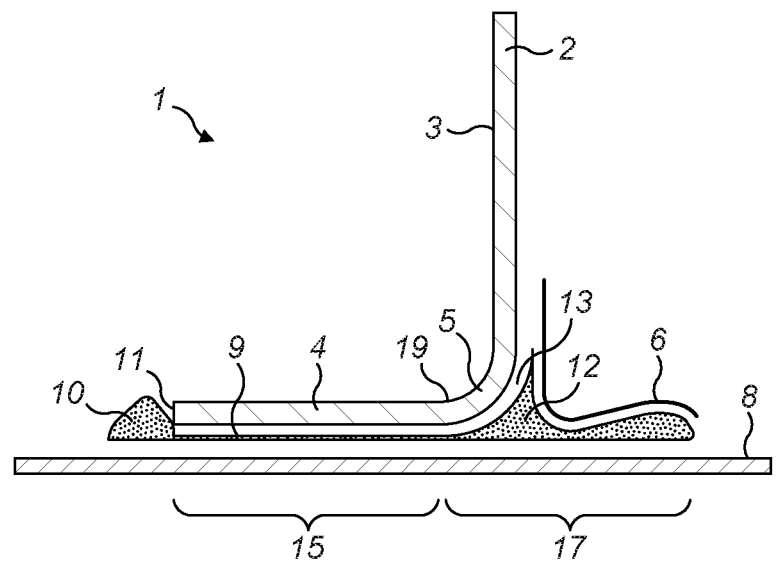
FIG. 2a shows a schematic view of a cross-section of the structural web assembly of FIG. 1 bonded to the inner surface of a wind turbine blade shell.

Referring now to FIG. 2a, a schematic view of a cross-section of the structural web assembly 1 bonded to the inner surface of a wind turbine blade shell 8 is shown. The scrivet 7 is omitted to avoid cluttering of the figure. In existing blade manufacturing processes, a bead of adhesive 9 is applied to the flange portion 4 of the web member 2 before bringing the wind turbine blade shell 8 into contact with the adhesive 9 and applying pressure to cause the adhesive 9 to be pushed along the breadth of the flange portion 4 in either direction and out from either side. The adhesive is then cured to form an adhesive bond between the web member 2 and the wind turbine blade shell 8. Pressure is maintained for the duration of the cure to improve the strength and integrity of the bond. In an alternative method, the bead of adhesive 9 is applied to the inner surface of the wind turbine blade shell 8 and the flange portion 4 of the web member 2 is applied to the adhesive and cured under pressure as described above.

FIG. 2a depicts an idealised view of the adhesive bond in which the adhesive 9 has been pushed out from between the flange portion 4 and the wind turbine blade shell 8 such that a first accumulation of adhesive 10 is formed at a free edge 11 of the flange portion 4, and such that a second accumulation of adhesive 12 is formed in a space 13 between the heel 5 of the web member 2, the glue catcher 6, and the inner surface of the wind turbine blade shell 8.

The purpose of the glue catcher 6 is to prevent the adhesive 9 from flowing away from the heel 5 as pressure is applied between the web member 2 and the wind turbine blade shell 8. It will be appreciated that it is imperative to have sufficient adhesive 9 in the region of the heel 5 to ensure a good bond between the web 1 and the shell 8. The purpose of the glue catcher 6 is to prevent the adhesive 9 from flowing away from the heel 5 as it is pushed out from between the web member 2 and the wind turbine blade shell 8, and to retain it in the space 13. In this way, enough adhesive 9 is located between the heel 5 of the web member 2 and the wind turbine blade shell 8 to provide sufficient coverage of the heel 5 and to avoid the formation of potentially crack propagating sharp interfaces.

Figure 2B:
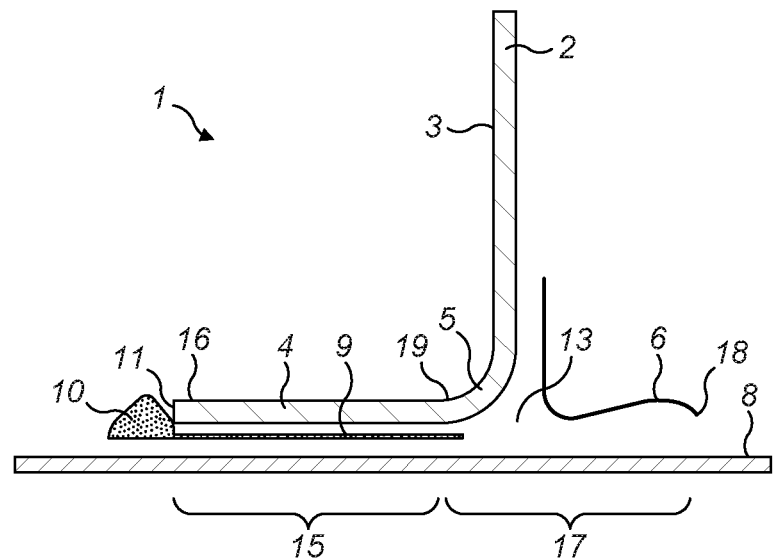
FIG. 2b shows a schematic view of a cross-section of a poor adhesive bond formed between the web assembly of FIG. 1 and a wind turbine blade shell.

FIG. 2b shows a schematic view of a cross-section of a poorly formed adhesive bond between the web assembly 1 and a wind turbine blade shell 8. In this example, the adhesive 9 has not been pushed sufficiently far along the flange portion 4 in the direction of the heel 5 such that no accumulation has formed in the space 13.

In FIG. 2a, adhesive 9 is disposed between the heel 5 and the blade shell 8. In other words, adhesive 9 covers the radius of the heel 5. This ensures a good adhesive bond between the web assembly 1 and the blade shell 8. In contrast, in FIG. 2b there is no adhesive 9 between the heel 5 and the blade shell 8, i.e. there is no adhesive 9 covering the radius of the heel 5. When the web assembly 1 of FIG. 2b is put under load, the web assembly 1 may fail in the region of the heel 5 as the heel 5 has not been adhesively bonded to the shell 8.

One of the problems of the prior art method of manufacture is that it is not possible to know if there is sufficient adhesive 9 in the space 13 to ensure that a robust bond has been formed. The glue catcher 6 is very flexible and the scrivets 7 are relatively weak. Because of this, it may be that the adhesive 9 has pushed the glue catcher 6 out of the way, and/or that the scrivets 7 have broken under the tensile loads caused by the adhesive 9 pushing against the glue catcher 6 as it is pushed out from between the web member 2 and the wind turbine blade shell 8.

Once the structural web assembly 1 is bonded between the wind turbine blade shells, it is not possible to visually inspect the adhesive bond. Furthermore, it is also not possible to interrogate the integrity of the adhesive bond in the region of the heel 5 using ultrasonic non-destructive testing (NDT) equipment as there is no internal feature in this region which may be reliably identified by ultrasonic NDT examination.

Referring to FIGS. 2a and 2b together, it is not possible to tell the difference between the two bond configurations shown using ultrasonic NDT analysis. As is well understood in the art of ultrasonic NDT analysis of wind turbine blade adhesive bonds, in order to ascertain if adhesive 9 is present in a particular region of a bonded area, it is necessary for there to be an identifiable feature in the interior of the wind turbine blade structure which can be positively identified. This is typically an interior surface.

In an NDT process, an ultrasonic transducer is positioned outside of the blade shell 8 (i.e. below the blade shells in the orientation of FIGS. 2a and 2b). The transducer emits an ultrasonic pulse into the blade shell 8. The ultrasonic waves will travel through the blade and will reflect at a back wall or at a defect in the structure.

Referring to FIG. 2b, in the region 15 extending over the breadth of the flange portion 4 from its free edge 11 to a position 19 immediately before the heel 5, the inner surface 16 of the flange portion 4 may be identified by NDT analysis as the ultrasonic signal reflects off the interface between the inner surface 16 and the air filled space in the interior of the blade. This occurs at a predictable/consistent depth (corresponding to a signal return time) so that the surface 16 may be positively identified. Positive identification of this surface provides a strong indication that the region between the flange portion 4 and the inner surface of the wind turbine blade shell 8 is filled with adhesive 9 and that therefore a good bond exists. If there is any portion of the region 15 in which there is an anomalous signal return at a lower depth (or a shorter signal return time), this indicates the existence of an air pocket somewhere below the surface 16, and hence a poor adhesive bond.

In contrast to this, in the region 17 extending from the position 19, immediately before the beginning of the heel 5, to the free end 18 of the glue catcher 6, there are no internal surfaces which may be positively identified by ultrasonic NDT analysis. Because of the curved shape of the heel 5 and the glue catcher 6, as well as the flexibility of the glue catcher 6 and the unpredictable formation of the accumulation of adhesive 12, it is not possible to positively identify any part of the interior blade structure in the region 17. For an NDT technician, the good adhesive bond of FIG. 2a would be indistinguishable from the poor adhesive bond of FIG. 2b.

Figure 3A:
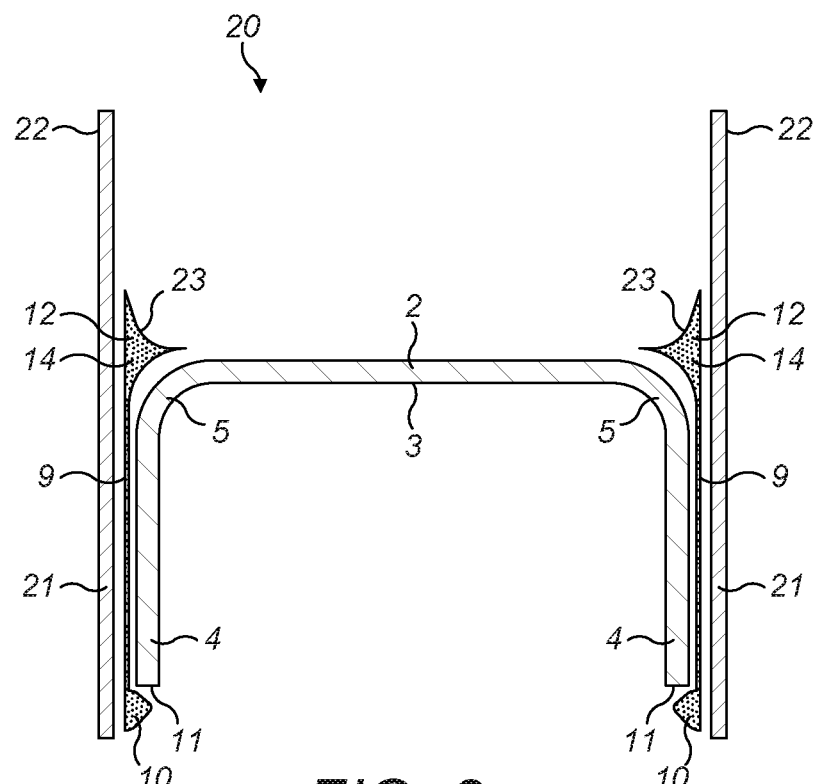
FIG. 3a shows a schematic view of a cross-section of a structural web according to the present invention.

Referring now to FIG. 3a, a schematic view of a cross-section of an example structural web 20 is shown. For simplicity, like reference numerals are used to identify like features throughout the description.

The structural web 20 comprises a web member 2 having a web portion 3 and two flange portions 4 located on either side of the web portion 3. The flange portions 4 extend transversely from the web portion 3. A heel 5 is located between each of the flange portions 4 and the web portion 3. Two flange extenders 21 are integrated with the flange portions 4 by means of an adhesive bond. In this example, adhesive 9 is located between the flange extenders 21 and the flange portions 4.

The web portion 3 and two flange portions 4 together form a 'C' shaped web. With the addition of the flange extenders 21 this results in an 'I' shaped web assembly. The heel 5 is the transition between the web portion 3 and the flange portion 4 and is curved, such that it has a radius. To ensure a good load path between the web portion 3 and the flange portion 4, the radius of curvature of the heel 5 may be 20 mm for example.

Figure 3B:
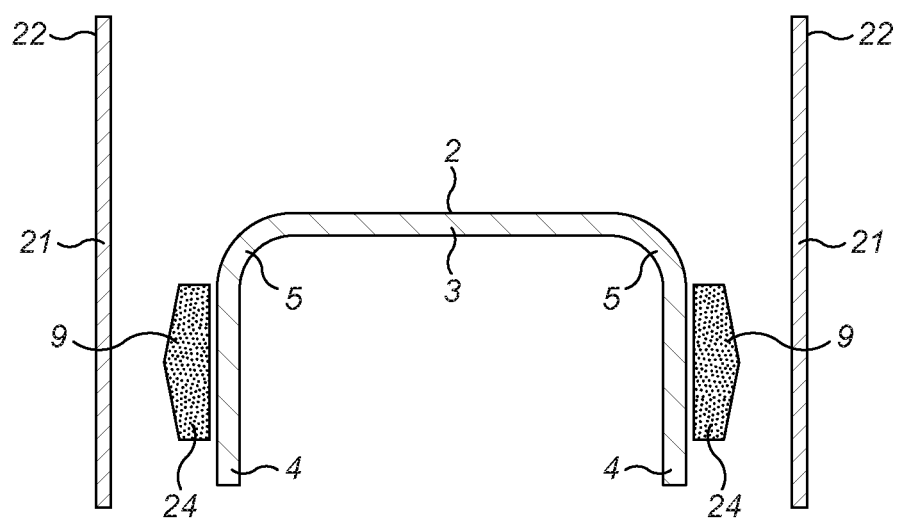

FIG. 3b shows a schematic representation of the manufacturing process for forming the structural web 20. A cured glass fibre composite web member 2 is provided along with two substantially planar cured glass fibre composite flange extenders 21. The flange extenders 21 may be rigid, or substantially rigid. In this example the flange extenders 21 are formed of a sheet of substantially planar cured glass fibre composite.

The web member 2 is placed on a mould (not shown) and a bead 24 of adhesive 9 is applied to an outer surface of each of the flange portions 4. The flange extenders 21 are positioned adjacent to the flange portions 4 such that a portion 22 of the flange extenders 21 project past the heels 5 and away from the web portion 3. Pressure is applied to bring the flange extenders 21 into contact with the adhesive 9 and to force the adhesive 9 to flow along the breadth of the flange portions 4 so that a layer of adhesive 9 is formed between the flange extenders 21 and the flange portions 4.

As shown in FIG. 3a, accumulations of adhesive 10 form at the free edges 11 of the flange portions 4 and an accumulation of adhesive 12 forms in the region of the heels 5 between the web member 2 and the flange extenders 21. In an optional, but recommended, step, a fillet profile 23 is formed in the accumulation of adhesive 12 in the region of the heels 5. In this way, the shape of the adhesive 9 in this area, and its interface with the flange extenders 21, heels 5, and web portion 3, can be accurately controlled to prevent any sharp interfaces being formed that might lead to stress concentrations in the finished wind turbine blade. In the example shown in FIG. 3a, the area between the flange extenders 21 and the web member 2 in the region of the heels 5 is entirely filled with adhesive 9.

Once the adhesive has a suitable profile 23, it is cured so that the flange extenders 21 become integrated with the flange portions 4 of the web member 2 to form the structural web 20. The pressure applied between the flange extenders 21 and the flange portions 4 of the web member 2 is maintained for the duration of the adhesive cure to better ensure the integrity of the adhesive bond.

The adhesive bond between the flange portions 4 and the flange extenders 21 can be visually inspected. As can be seen there is an accumulation 10 of adhesive 9 at the free edge 11 of the flange portion 4 and an accumulation of adhesive 12 in the region of the heel 5 between the web member 2 and the flange extenders 21. This indicates that there will be adhesive across the full width of the flange portion 4. In addition, where the flange extender 21 is formed from glass fibre reinforced plastic it will be translucent, so a visual inspection of the adhesive bond can also be carried out simply by looking through the flange extender 21. These simple visual inspections can be used to qualify the use of the structural web 20 in the wind turbine blade manufacturing process.

The adhesive 9 that forms in the region of the heel 5 between the web member 2 and the flange extenders 21 (e.g. 12 in FIG. 3a) can be more generally referred to as "heel coverage" 14. The heel coverage 14 covers the radius of the heel 5; in particular it covers the outer radius of the heel. This heel coverage 14 ensures a good adhesive bond between the heel 5 and the flange extender 21.

Figure 4:
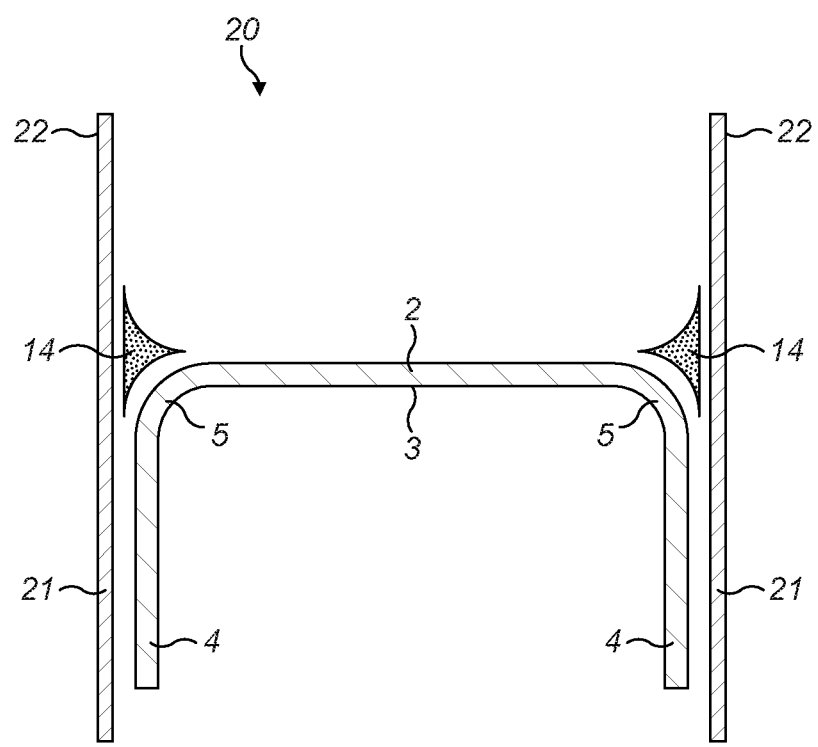
FIG. 4 shows a schematic view of a cross-section of an alternative structural web according to the present invention.

FIG. 4 shows a schematic view of the manufacturing process for an alternative example structural web 20. In this example, in the finished structural web 20, there is no separate adhesive 9 between the flange portions 4 of the web member 2 and the flange extenders 21. Rather, the flange extenders 21 are integrated with the flange portions 4 in a cured resin matrix.

Heel coverage 14 is provided between the web member 2 and the flange extenders 21 in the region of the heel 5 to provide a suitable load transfer path without sharp edges or transitions.

In the example of FIG. 4, an uncured web member 2 is placed on a mould (not shown) and the flange extenders 21 are positioned adjacent to the flange portions 4 of the web member 2 such that a portion 22 of the flange extenders 21 project past the heels 5 and away from the web portion 3. The flange extenders 21 in this example may be uncured fibre composite lay-ups of dry or pre-impregnated fibres. However, it is recommended that the flange extenders 21 comprise a pre-cured fibre composite material.

If the web member 2 comprises a lay-up of dry fibre material, the assembly is enclosed in a vacuum bag and resin is infused into the fibre lay-up prior to curing in a vacuum assisted resin transfer moulding technique (VARTM). If the web member 2 comprises a lay-up of pre-impregnated fibre material, the resin infusion step is not required and the resin is cured in a conventional pre-preg process. During the resin cure, the flange extenders 21 become integrated with the flange portions 4 of the web member 2 to form the structural web 20.

In the example of FIG. 4, the heel coverage 14 may be provided as a bead of adhesive 9. Alternatively, the heel coverage 14 may be provided as a filler material, integrated with resin.

For example, when the heel coverage 14 is a bead of adhesive, the adhesive 9 may be applied before the resin is cured (in the VARTM or pre-preg process) such that the adhesive 9 is in place and is cured along with the resin. Alternatively, the adhesive 9 may be applied after the resin is cured. The adhesive 9 is then cured in a separate step. A combination of these two methods may be used such that some of the adhesive 9 is applied before the resin cure, and a subsequent application of adhesive 9 is made after the resin cure. In either case, the adhesive 9 is preferably shaped with a filet profile 23 to ensure no sharp transitions between the adhesive 9 and the web member 2 or flange extenders 21.

When the heel coverage 14 is a filler material this may be incorporated as part of a VARTM process. A filler material, such as a fibrous rope, is placed between the web member 2 and the flange extender 21 in the region of the heel 5. During the resin infusion step, resin will infuse into the filler material to provide the heel coverage 14.

Regardless of whether the heel coverage 14 is a bead of adhesive or a filler material infused with resin, the end result is the same. Namely, a region of adhesive or resin which covers the radius of the heel 5 and ensures a good adhesive bond between the heel 5 and the flange extender 21.

Figure 5A:
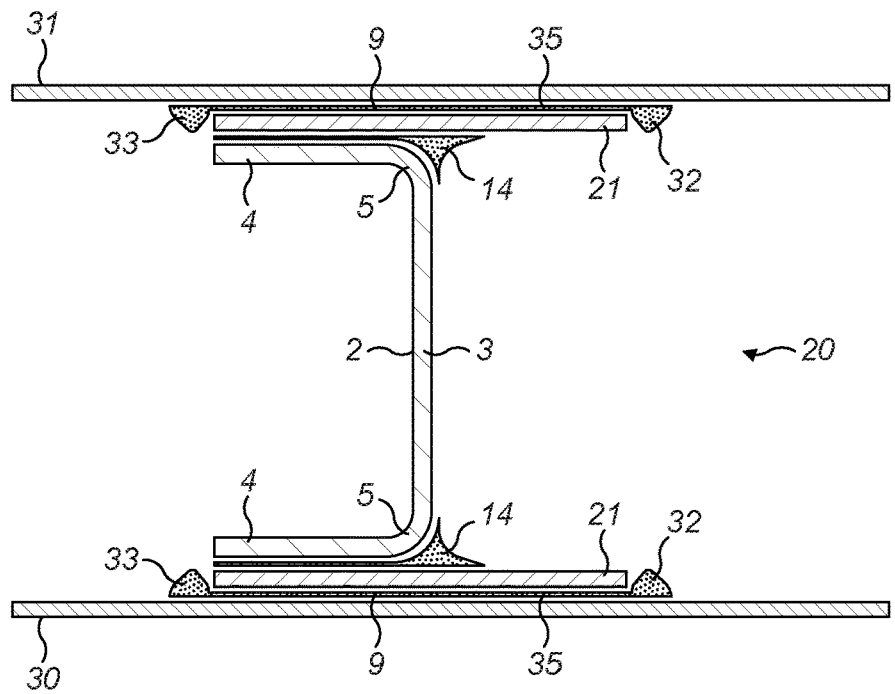
FIG. 5a shows a schematic cross-sectional view of the structural web of FIG. 3a bonded between first and second wind turbine blade shells.

FIG. 5*a* shows a schematic cross-sectional view of a structural web 20 bonded between first 30 and second 31 wind turbine blade shells. As shown, the structural web 20 is adhesively bonded to the inner surface of the wind turbine blade shells 30, 31 by adhesive 9. The structural web 20 depicted in FIG. 5*a* corresponds to the structural web 20 of FIG. 3*a*. However, it will be understood that any of the structural web configurations described above may be used in place of the structural web 20 shown.

Figure 5B:
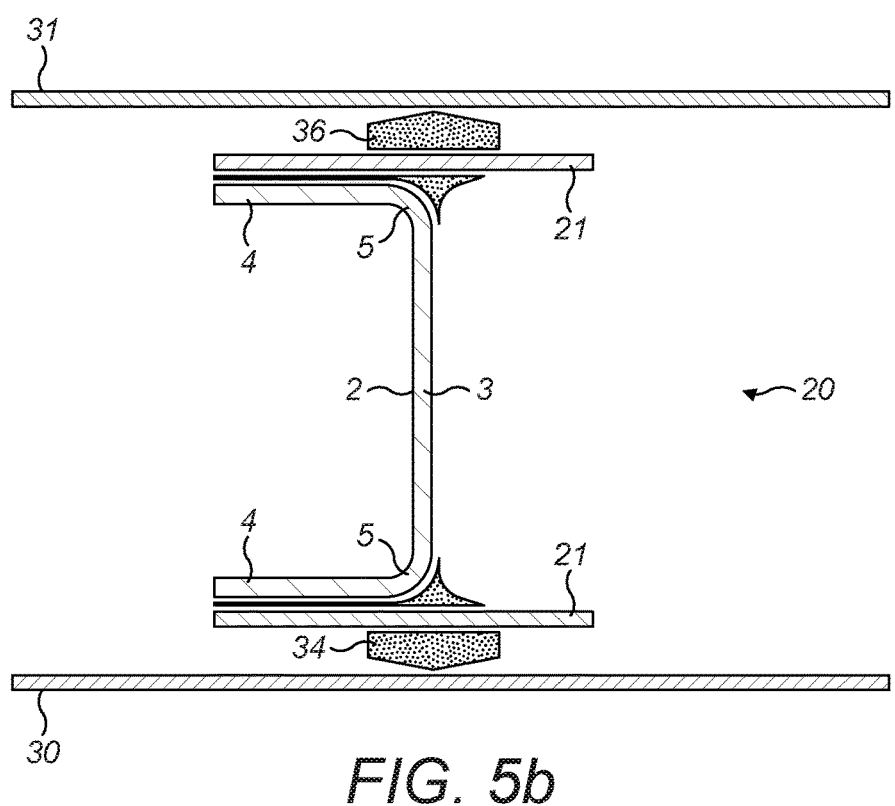
FIG. 5b shows a schematic representation of a method for bonding the structural web of FIG. 3a to the inner surfaces of the wind turbine blade shells.

FIG. 5*b* shows a schematic representation of a method for bonding the structural web 20 to the inner surfaces of the wind turbine blade shells 30, 31. In a first step, a bead 34 of adhesive 9 is applied to the inner surface of the first wind turbine blade shell 30. The structural web 20 is then placed on top of the adhesive 9 and pressure is applied to cause the adhesive 9 to flow between the flange extender 21 and the inner surface of the first wind turbine blade 30. Under the action of the applied pressure the adhesive 9 forms a layer 35 between the flange extender 21 and the inner surface of the first wind turbine blade 30. The adhesive 9 also forms accumulations 32, 33 at each free end of the flange extender 21. The adhesive 9 is then cured with the pressure being maintained throughout the duration of the cure.

After curing of the adhesive bond between the structural web 20 and the first wind turbine blade shell 30, a bead 36 of adhesive 9 is applied to the outermost surface of the remaining un-bonded flange extender 21. The second wind turbine blade shell 31 is placed on top of the adhesive 9 and pressure is applied to cause the adhesive 9 to flow between the flange extender 21 and the inner surface of the second wind turbine blade 31. Under the action of the applied pressure the adhesive 9 forms a layer 35 between the flange extender 21 and the inner surface of the second wind turbine blade 31 and forms accumulations 32, 33 at each free end of the flange extender 21. The adhesive 9 is cured with the pressure being maintained throughout the duration of the cure.

FIG. 5*b* has been described with respect to a two stage joining process, where the structural web is first bonded to the lower shell before it is bonded to the upper shell. However, a one stage joining process can also be used where the structural web is bonded to both shells simultaneously.

Figure 6A:
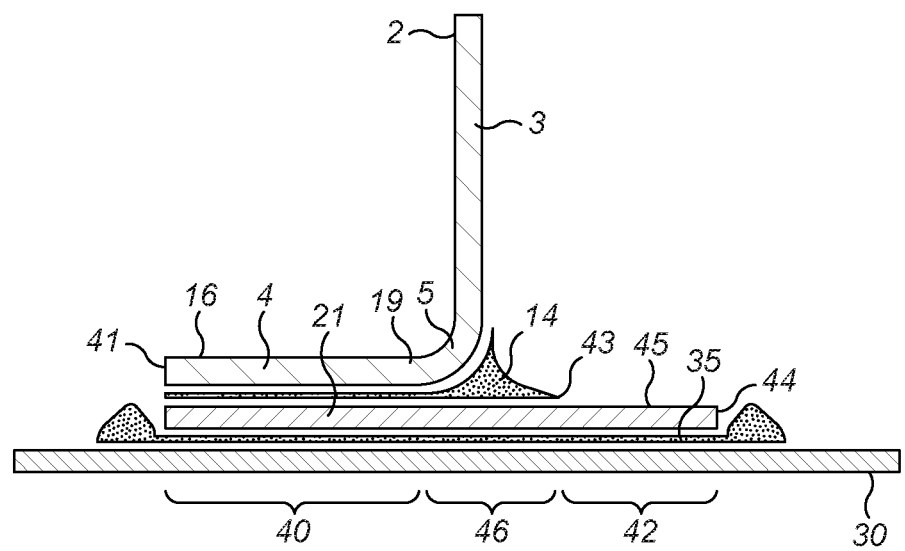

FIG. 6*a* shows a schematic cross-sectional view of a section of the bonded structural web 20 and first wind turbine blade shell 30 of FIG. 5*a*. In a region 40 extending over the breadth of the flange portion 4 and flange extender 21 from a first free edge 41 to a position 19 immediately before the heel 5, the inner surface 16 of the flange portion 4 may be identified by NDT analysis as the ultrasonic signal reflects off the interface between the inner surface 16 and the air filled space in the interior of the blade. This occurs at a predictable/consistent depth (corresponding to a signal return time) so that the surface 16 may be positively identified. Positive identification of this surface provides a strong indication that the region between the flange extender 21 and the inner surface of the first wind turbine blade shell 30 is filled with adhesive and that a good bond exists in region 40. If there is any portion of the region 40 in which there is an anomalous signal return at a lower depth (or a shorter signal return time), this indicates the existence of an air pocket somewhere below the surface 16 and hence a poor adhesive bond. There should not be any defects in the bondline between the flange portion 4 and the flange extender 21 as this has already been visually inspected as described above. However, if there are any defects in the bondline between the flange portion 4 and the flange extender 21 this will be identified by the NDT analysis.

Similarly, in region 42 extending from a free edge 43 of the heel coverage 14 to a second free edge 44 of the flange extender 21, an inner surface 45 of the flange extender 21 may be identified by NDT analysis as the ultrasonic signal reflects off the interface between the inner surface 45 of the flange extender and the air filled space in the interior of the blade. Once again, this occurs at a predictable/consistent depth (corresponding to a signal return time) so that the surface 45 may be positively identified. As before, positive identification of this surface provides a strong indication that the region 42 between the flange extender 21 and the inner surface of the first wind turbine blade shell 30 is filled with adhesive and that therefore a good bond exists. If there is any portion of the region 42 in which there is an anomalous signal return at a lower depth (or a shorter signal return time), this indicates the existence of an air pocket somewhere below the surface 45 and hence a poor adhesive bond.

In contrast to the above, in the region 46 extending from the position 19 at the beginning of the heel 5 to the free edge 43 of the heel coverage 14, there are no internal surfaces which may be positively identified by ultrasonic NDT analysis. Because of the curved shape of the heel 5 and the heel coverage 14 in this region, it is not possible to positively identify any part of the interior blade structure in region 46. However, in view of the fact that it has been possible to ascertain that there is a good adhesive bond in the neighbouring regions 40 and 42, it is possible to surmise that, in all probability, the bond is also good in region 46.

Figure 6B:
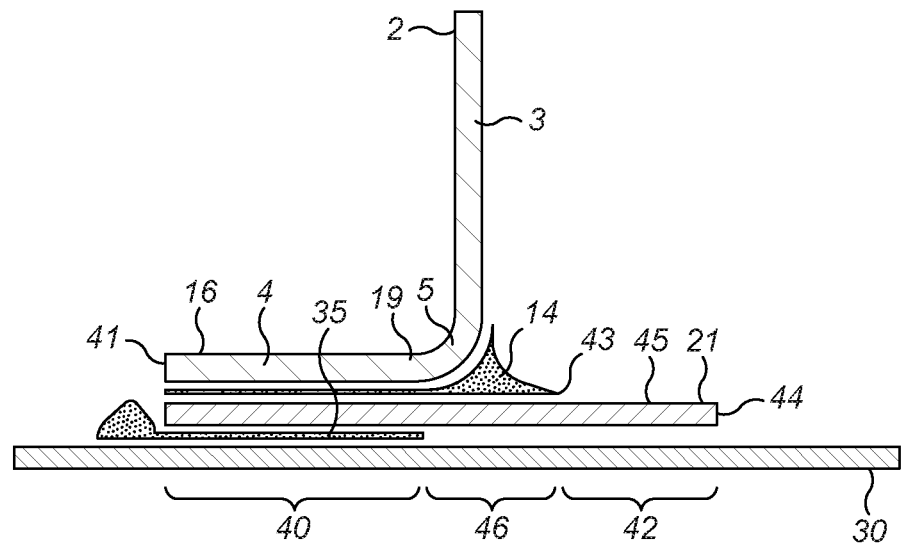
FIG. 6b shows a schematic cross-sectional view of a section of the bonded structural web having a poor bond with the inner surface of a wind turbine blade shell.

By way of contrast, FIG. 6*b* depicts a schematic cross-sectional view of a section of a bonded structural web 20 having a poor bond between the flange extender 21 and the inner surface of the wind turbine blade 30. In this case, it is possible to ascertain by ultrasonic NDT analysis that the bond in region 40 is good and that the bond in region 42 is poor. It is not possible to ascertain the condition of the bond in region 46. As the bond in region 42 is poor, this indicates that there may also be a poor bond in region 46 as well; and, as has been described above, if the bondline between the heel 5 and the blade shell 8 is poor this can lead to failure. Therefore, because it is known that the bond in region 42 is poor, it is possible to prevent the wind turbine blade from being passed through a quality control process and to ensure that the poor bond is fixed before the blade is put into service.

As a result of the configuration of the structural web 20 and the manufacturing process described above, it is possible to have a high level of certainty that the adhesive bonds in the wind turbine blade between the structural web 20 and the wind turbine blade shells 30, 31 are robust. This is because the adhesive bonds in the structural web 20 are either visible or suitable for ultrasonic NDT analysis before the structural web 20 is bonded into the wind turbine blade, and because the adhesive bond between the structural member 20 and the wind turbine blade shells 30, 31 may be interrogated by ultrasonic NDT analysis in such a way as to provide a sufficient level of certainty that the bond is robust across its entire breadth.

In the examples described the web 20 is formed from glass fibre reinforced plastic (GFRP). The plastic matrix may be an epoxy matrix, for example. The adhesive used to bond the flange portion 4 to the flange extender 21 may be an epoxy or a polyurethane adhesive, for example. The adhesive used to bond the flange extender 21 to the blade shells may also be an epoxy or a polyurethane adhesive, for example. The wind turbine blade shells may be formed from GFRP and may also include carbon fibre reinforced plastic (CFRP).

In the examples described above the structural web 20 is formed first as a 'C' shaped web, and then the addition of the flange extenders results in an 'I' shaped web. However, it would also be possible to use the flange extender 21 on a single side of the web, rather than on both sides as shown in the Figures.

As described the flange extender 21 is a pre-cured composite component that is attached to the flange portions 4 of the web. The flange extender may have a thickness of between 0.5 mm and 1 mm, preferably around 0.8 mm. The flange portions 4 of the web may have a thickness of between 1 mm and 5 mm, preferably between 2 mm and 3 mm. Therefore, it can be seen that the flange extender 21 is a relatively thin component that is attached to the flange portion 4 as a process aid for adhesively bonding the structural web 20 to the blade shell. In other words, the flange extender does not contribute to the structural strength of the web, other than by ensuring a robust bond between the web and the shell.

The invention claimed is:

1. A method of forming a structural web for a wind turbine blade, the method comprising:
   providing a web member having a web portion and a flange portion extending away from the web portion, wherein the web member comprises a heel of substantially curvilinear form located between the web portion and the flange portion;
   providing a flange extender of substantially planar form, wherein the flange extender comprises a cured composite material;
   arranging the cured flange extender together with the web member such that the cured flange extender is positioned adjacent to the flange portion and such that a portion of the cured flange extender projects past the heel and away from the web portion; and then
   integrating the cured flange extender together with the web member in a resin matrix, or with an adhesive, to form the structural web,
   wherein the resin matrix, or adhesive, between the heel and the cured flange extender is externally exposed so as to permit a visual inspection of a bond between the web member and the cured flange extender at the heel.

2. The method according to claim 1, comprising applying adhesive between the web member and the flange extender.

3. The method according to claim 2, comprising applying the adhesive in a region of the heel.

4. The method according to claim 3, wherein applying the adhesive comprises applying the adhesive to the web member and the flange extender at substantially the same time.

5. The method according to claim 2, comprising placing a filler material between the web member and the flange extender.

6. The method according to claim 5, wherein the filler material comprises a rope positioned substantially adjacent to the heel.

7. The method according to claim 2, wherein applying the adhesive comprises:
   applying a bead of adhesive to the flange portion;
   bringing the flange extender into contact with the adhesive; and
   applying a compressive force between the flange portion and the flange extender.

8. The method according to claim 1, wherein the web member comprises an uncured composite material prior integration of the flange extender with the web member.

9. The method according to claim 2, comprising forming a fillet in the adhesive.

10. The method according to claim 1, wherein the web member comprises two flange portions.

11. The method according to claim 10, wherein the web member has a substantially C-shaped cross-section.

12. The method according to claim 10, comprising integrating a flange extender with each flange portion.

13. The method of forming a wind turbine blade, the method comprising:
    forming a structural web using the method of claim 1;
    positioning the structural web between windward and leeward wind turbine blade shells; and
    bonding the structural web to the windward and leeward wind turbine blade shells.

14. A structural web for a wind turbine blade comprising:
    a web member having a web portion and a flange portion extending away from the web portion, wherein the web member comprises a heel of substantially curvilinear form located between the web portion and the flange portion; and
    a cured flange extender integrated with the flange portion of the web member using a resin matrix or with an adhesive to form the structural web, wherein a first section of the cured flange extender overlies the flange portion and a second section of the cured flange extender extends past the heel and away from the web portion of the web member,
    wherein the resin matrix or adhesive between the heel and the cured flange extender is externally exposed so as to permit a visual inspection of a bond between the web member and the cured flange extender at the heel.

15. The structural web according to claim 14, comprising a bead of adhesive located between the heel of the web member and the flange extender.

16. The structural web according to claim 15, comprising a rope filler material embedded within, or located under, the bead of adhesive.

17. A wind turbine blade comprising the structural web of claim 14.

\* \* \* \* \*